United States Patent [19]

Rim et al.

[11] Patent Number: 5,550,591
[45] Date of Patent: Aug. 27, 1996

[54] MOTION COMPENSATOR FOR DIGITAL IMAGE RESTORATION

[75] Inventors: Chai Y. Rim; Seong W. Hong, both of Seoul, Rep. of Korea

[73] Assignee: Goldstar Co., Ltd., Seoul, Rep. of Korea

[21] Appl. No.: 330,522

[22] Filed: Oct. 28, 1994

[30] Foreign Application Priority Data

Oct. 28, 1993 [KR] Rep. of Korea ................ 22575/1993

[51] Int. Cl.$^6$ ........................................ H04N 7/32
[52] U.S. Cl. .................... 348/413; 348/411; 348/699
[58] Field of Search ............................ 348/384, 390, 348/396, 400–402, 407, 409–413, 415, 416, 420, 699; 382/232, 236, 238; H04N 7/130, 7/137

[56] References Cited

U.S. PATENT DOCUMENTS

| | | | |
|---|---|---|---|
| 4,546,386 | 10/1985 | Matsumoto et al. | 348/412 |
| 4,571,618 | 2/1986 | Hatori et al. | 348/412 |
| 5,175,618 | 12/1992 | Ueda et al. | 348/699 |
| 5,227,878 | 7/1993 | Puri et al. | 348/416 |
| 5,235,419 | 8/1993 | Krause | 348/416 |
| 5,317,397 | 5/1994 | Odaka et al. | 348/416 |
| 5,355,378 | 10/1994 | Ohta | 348/413 |
| 5,412,428 | 5/1995 | Tahara | 348/396 |
| 5,412,430 | 5/1995 | Nagata | 348/413 |
| 5,412,435 | 5/1995 | Nakajima | 348/699 |
| 5,481,310 | 1/1996 | Hibi | 348/413 |
| 5,488,419 | 1/1996 | Hui et al. | 348/402 |

*Primary Examiner*—Tommy P. Chin
*Assistant Examiner*—Richard Lee
*Attorney, Agent, or Firm*—Finnegan, Henderson, Farabow, Garrett & Dunner, L.L.P.

[57] ABSTRACT

A motion compensator for restoring a digital image which includes a motion compensating controller for receiving motion vector data and outputting control signals, a data interface for shifting input data, first and second field motion compensators for interpolating and performing motion compensation for field vectors, a frame motion compensator for interpolating and performing motion compensation for frame vector data, and a first multiplexer for selecting the motion compensated signal to be output, such that receiving data of a motion search area is processed in multitude and the motion compensation is processed in real time.

23 Claims, 7 Drawing Sheets

| | | | | | | | | |
|---|---|---|---|---|---|---|---|---|
| $P_{1,1}$ | $P_{1,2}$ | $P_{1,3}$ | · | · | · | · | · | $P_{1,16}$ |
| $P_{2,1}$ | $P_{2,2}$ | $P_{2,3}$ | · | · | · | · | · | $P_{2,16}$ |
| · | | | | | | | | |
| · | | | | | | | | |
| · | | | | | | | | |
| $P_{16,1}$ | $P_{16,2}$ | $P_{16,3}$ | · | · | · | · | · | $P_{16,16}$ |
| $Q_{1,1}$ | $Q_{1,2}$ | $Q_{1,3}$ | · | · | · | · | · | $Q_{1,16}$ |
| $Q_{2,1}$ | $Q_{2,2}$ | | · | · | · | · | · | $Q_{2,16}$ |
| · | | | | | | | | |
| · | | | | | | | | |
| · | | | | | | | | |
| $Q_{16,1}$ | $Q_{16,2}$ | $Q_{16,3}$ | · | · | · | · | · | $Q_{16,16}$ |

| | | | | | | | |
|---|---|---|---|---|---|---|---|
| $Q_{1,2}$ | $Q_{1,3}$ | · | · | · | · | · | $Q_{1,16}$ |
| $P_{2,2}$ | $P_{3,3}$ | · | · | · | · | · | $Q_{3,16}$ |
| $Q_{3,2}$ | $Q_{4,3}$ | · | · | · | · | · | · |
| · | | | | | | | · |
| · | | · | · | · | · | · | · |
| · | | | | | | | · |
| $Q_{16,2}$ | $Q_{16,3}$ | · | · | · | · | · | $Q_{16,16}$ |

FIG. 12

MOTION COMPENSATOR FOR DIGITAL IMAGE RESTORATION

BACKGROUND OF THE INVENTION

1. Field of the Invention

The present invention relates to a motion compensator for restoring a digital image, which restores the original digital image by decoding digital data compressed using the motion of the digital image, and, more particularly, to a motion compensator for restoring a digital image, which receives data of a motion search area quickly and then efficiently processes the data, thereby compensating for the motion in real time.

2. Discussion of the Related Art

Figure 1:
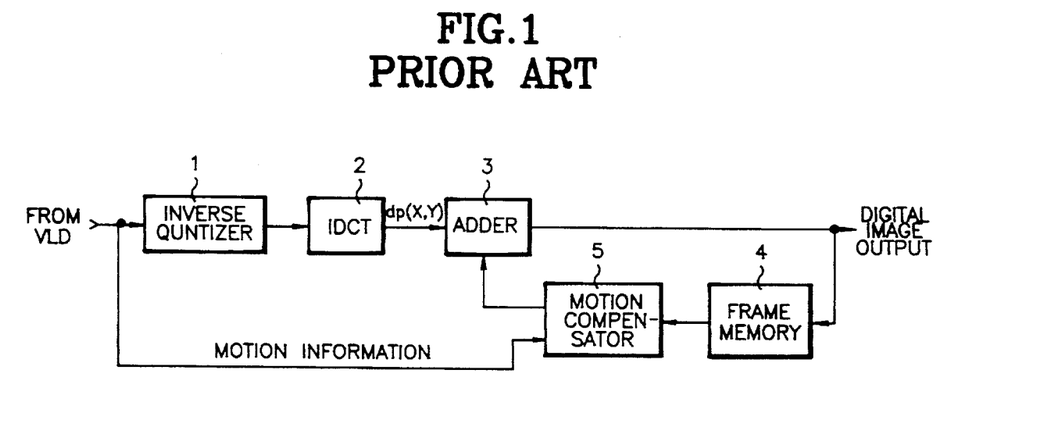
FIG. 1 is a block diagram of a general image decoder.

Generally, an image decoder for protecting compressed digital image data and restoring it to the original digital image, as shown in FIG. 1, comprises an inverse quantizer 1 for inverse quantizing digital data input from a variable length decoder (VLD), an inverse discrete cosine transformer (IDCT) 2 for IDCT-transforming the output signal of inverse quantizer 1, an adder 3 for adding a motion-compensated estimation signal of the present frame to the output signal of IDCT 2, a frame memory 4 for temporarily storing and outputting the output signal of adder 3, and a motion compensator 5 for estimating a motion-compensated present frame by accessing the preceding frame data stored in frame memory 4 and using the motion information output from the VLD, and outputting the estimated result to adder 3.

The image decoder inverse-quantizes the digital data input from the VLD in inverse quantizer 1, and the IDCT-transforming the inverse-quantized data in IDCT 2. The resulting data is input to adder 3.

If the input digital data, is a digital signal coded by motion estimation, the motion compensator 5 accesses the data of the preceding frame stored in frame memory 4 and estimates the present frame, compensating for motion according to the motion information output from the VLD. The estimated data is output to adder 3.

Adder 3 adds the signal output from IDCT 2 to the signal output from motion compensator 5, and then outputs the added result as a digital image of the present invention. The output digital image is restored in frame memory 4 for use in estimating a present frame.

Figure 2:
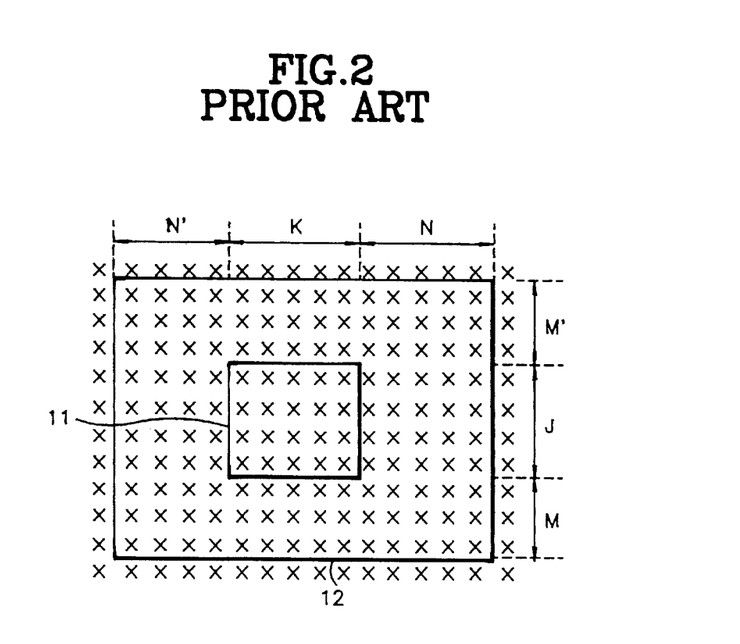
FIG. 2 is a diagram showing the relationship between a macro block and a motion search area.

In the case where a macro block is used in coding units of motion information, i.e., motion vectors, the relationship between the macro block and the motion search area will be explained below with reference to FIG. 2.

Given that the size of macro block 11 is J×K, that the vertical search range of motion search area 12 lies within M' and M, and that the horizontal search range thereof is N' and N, the size of motion search area 12 becomes (M'+M+J)×(N'+N+K).

Figure 3:
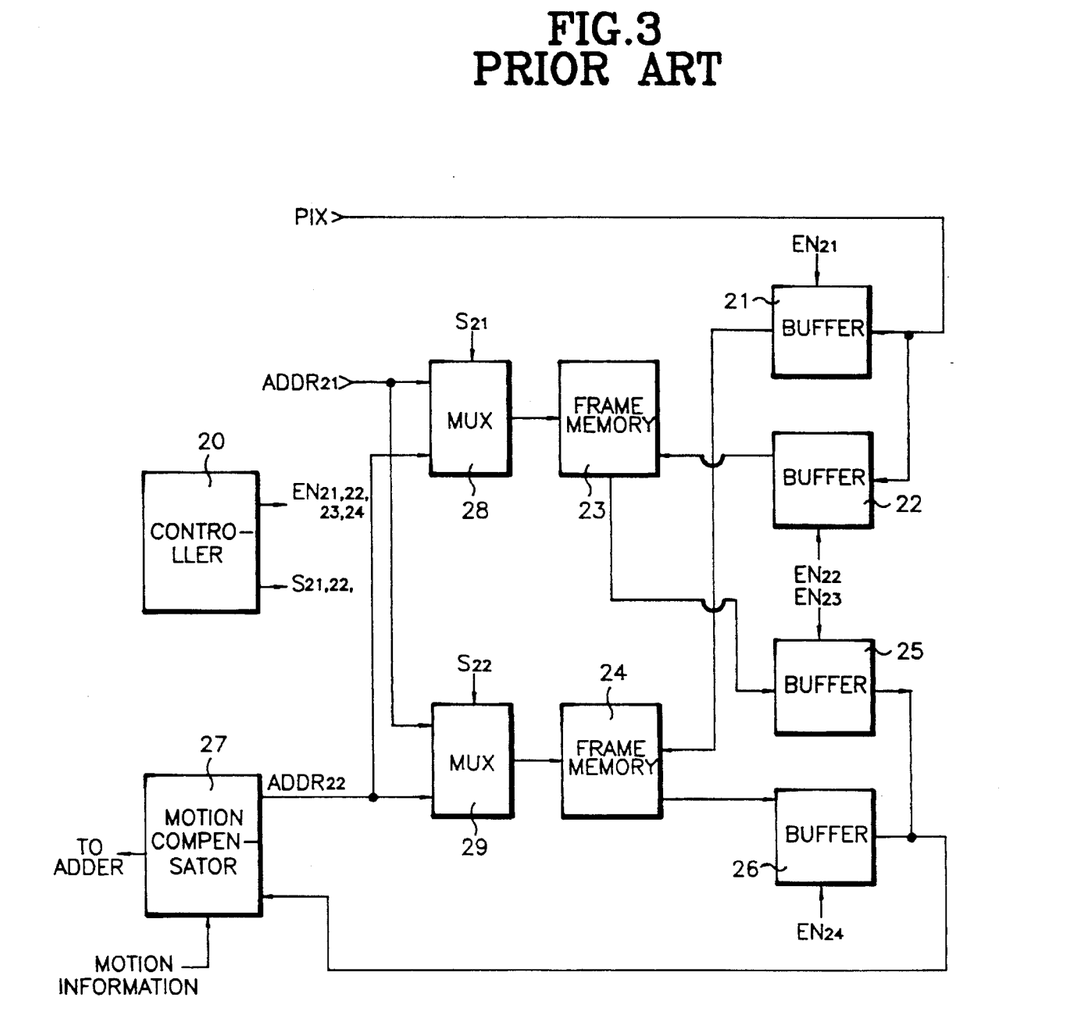
FIG. 3 is a block diagram showing a conventional motion compensator.

FIG. 3 is a circuit diagram of a conventional motion compensator 5. As shown in FIG. 3, motion compensator 5 comprises a controller 20 for outputting enable signals EN21–EN24 and switching signals S21 and S22 which are intended to control the motion compensation of an input digital image signal PIX. Buffers 21 and 22 are selectively enabled according to enable signals EN21 and EN22 output from the controller 20, for passing the input digital image signal PIX to frame memories 23 and 24 for temporarily storing and outputting the output signals of buffers 21 and 22 in units of a frame. Buffers 25 and 26 are selectively enabled according to enable signals EN23 and EN24, output from the controller 20, for passing the output signals of frame memories 23 and 24. A motion compensator 27 outputs an address signal ADDR22, according to the motion information input from the VLD, compensating for the motion of the digital image using the output signals of buffers 25 and 26, and outputting the compensation result to the adder 3. Multiplexers 28 and 29 selectively apply address signal ADDR21, input in synchronization with input digital image signal PIX, and address signal ADDR22, output from motion compensator 27, to frame memories 23 and 24 according to switching signals S21 and S22 output from the controller 20.

The conventional motion compensator 5 requires two frame memories 23 and 24 in order to compensate for the motion of digital image signal PIX input from adder 3. When one frame memory stores frame data of digital image signal PIX, motion compensator 27 accesses the frame data stored in the other frame memory for the purpose of motion compensation.

Specifically, buffers 21 and 25 are enabled according to enable signals EN21 and EN23 output from controller 20. Multiplexers 28 and 29 selectively output address signals ADDR22 and ADDR21, according to switching signals S21 and S22, the frame memory 24 sequentially stores the digital image signal PIX of the present frame, having passed buffer 21, according to address signal ADDR21, which multiplexer 29 selectively outputs. Frame memory 23 outputs the stored digital image signal of the preceding frame according to an address signal ADDR22, which the multiplexer 28 selectively outputs to motion compensator 27 via buffer 25.

Next, buffers 22 and 26 are enabled according to enable signals EN22 and EN24 output from the controller 20, and multiplexers 28 and 29 selectively output address signals ADDR21 and ADDR22 according to switching signals S21 and S22. Frame memory 23 sequentially stores the digital image signal PIX, having passed buffer 22, according to an address signal ADDR21 which the multiplexer 28 selectively outputs. Frame memory 24 inputs the stored digital image signal to motion compensator 27 via buffer 26 according to the address signal ADDR22 which multiplexer 29 outputs. This operation is performed repeatedly.

Given that motion information, that is, a motion vector at pixel position (X,Y), is $MV_x, MV_y$ horizontally and vertically, the motion compensator 27 accesses frame memories 23 and 24 which have stored the digital image data of the preceding frame, and output address signal ADDR22. Motion compensation is performed as in the following equations I–IV and the result is output to the adder.

$$P_t(X,Y) = P_{t-1}(X-MV_x, Y-MV_y) \quad (I)$$

$$P_{t-1}(X+0.5, Y) = \{P_{t-1}(X,Y) + P_{t-1}(X+1,Y)\}/2 \quad (II)$$

$$P_{t-1}(X, Y+0.5) = \{P_{t-1}(X,Y) + P_{t-1}(X,Y+1)\}/2 \quad (III)$$

$$P_{t-1}(X+0.5, Y+0.5) = \{P_{t-1}(X,Y) + P_{t-1}(X+1,Y) + P_{t-1}(X,Y+1) + P_{t-1}(X+1,Y+1)\}/4 \quad (IV)$$

Here, $P_{t-1}(X,Y)$ is digital image data of the preceding frame. $P_t(X,Y)$ is the output signal of motion compensator 27 and is added to the output signal of IDCT 2, thereby forming image data of the present invention. Equations II–IV are designed to form a pixel value for every one-half of one pixel when the motion vector corresponds to one-half of one pixel.

The conventional motion compensator, however, needs a great amount of calculation for motion compensation per pixel so that operation is performed by receiving only pixels requiring motion compensation from the frame memory. If the size of the frame is large, the amount of calculation required becomes extremely great and is very hard to perform in real time. Further, the calculation amount varies whether the motion vector is an integer or a one-half of one pixel, thereby changing the overall time of calculation.

SUMMARY OF THE INVENTION

The present invention has been made in view of the above circumstances and has as an object, to provide a motion compensator which receives data of a motion search area so as to compensate for the motion of a macro block, and processes the motion compensation in parallel, thereby compensating for the motion of nearby macro blocks in real time.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the motion compensator for restoring a digital image, of this invention, comprises in one embodiment, a motion compensating controller for receiving a motion vector and a motion vector-type signal for indicating a vector type of field or frame, in synchronization with a clock and generating a motion displacement signal of the motion vector, start signals and a control signal, for controlling the entire operation of said motion compensator. A data interface is used for sequentially shifting input data according to the control signal output from the motion compensating controller. First and second field motion compensators are provided for receiving the shifted data, output from the data interface, according to the motion displacement signal and the start signals output from the motion compensating controller, for performing vertical and horizontal interpolation on the received shifted input data, and for performing motion compensation in units of one half of one pixel with respect to a field motion vector. A frame motion compensator receives the shifted input data, output from the data interface, according to the motion displacement signal and the start signals output from the motion compensating controller, for performing vertical and horizontal interpolation on the received shifted input data and for performing motion compensation in units of one-half of one pixel with respect to a frame motion vector. A first multiplexer for selects and outputs a compensated signal from one of the first and second field motion compensators and the frame motion compensator according to the control of the motion compensating controller.

In another aspect of the present invention, there is provided embodiment of the motion compensator for restoring a digital image which includes a motion compensating controller for receiving a motion vector and a motion vector-type signal for indicating a vector type of field or frame, in synchronization with a clock and generating a motion displacement signal of the motion vector, start signals and a control signal, for controlling the entire operation of the motion compensator. A data interface is included for sequentially shifting input data according to the control signal output from the motion compensating controller. First and second field/frame motion compensators receive the shifted input data, output from the data interface, according to the motion displacement signal and the start signals output from the motion compensating controller, for performing vertical and horizontal interpolation on the received shifted input data, and for performing motion compensation in units of one-half of one pixel with respect to a field/frame motion vector. A first multiplexer selects and outputs a compensated signal from one of the first and second field/frame motion compensators according to the control of the motion compensating controller.

BRIEF DESCRIPTION OF THE DRAWINGS

The accompanying drawings, which are incorporated in and constitute a part of this specification, illustrate embodiments of the invention and, together with the description, serve to explain the objects, advantages and the principles of the invention. In the drawings.

DETAILED DESCRIPTION OF THE INVENTION

Hereinafter, preferred embodiments of the present invention will be described with reference to the attached drawings.

Figure 4:
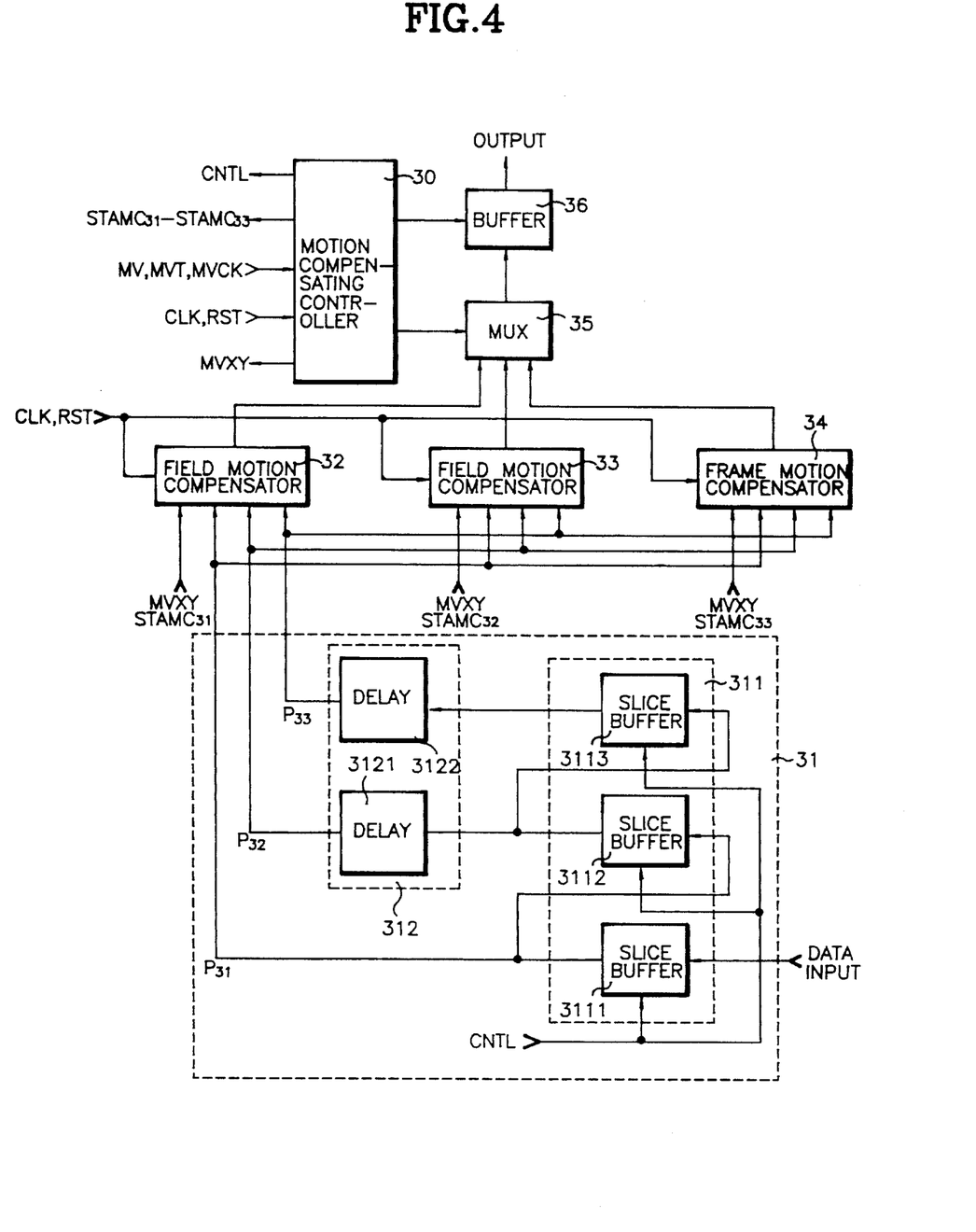
FIG. 4 is a block diagram illustration of one embodiment of a motion compensator of the present invention.

As shown in FIG. 4, a motion compensator of the present invention comprises a motion compensating controller 30, a data interface 31, two field motion compensators 32 and 33, a frame motion compensator 34, a multiplexer 35, and a buffer 36.

Motion compensating controller 30 receives a motion vector MV and a motion vector-type signal MVT in synchronization with a clock MVCK, and generating displacement signal MVXY of the motion vector, start signals STAMC31–STAMC33 and a control signal CNTL, for controlling the entire operation of the motion compensator. A clock signal CLK and a reset signal RST are also provided for the motion compensating controller 30.

Data interface 31 sequentially shifts input data according to control signal CNTL output from motion compensating controller 30.

Data interface 31 is made up of a slice buffer portion 311 and a delay portion 312. The slice buffer 311 includes a plurality of serially coupled slice buffers 3111, 3112 and 3113. These serial slice buffers sequentially shift input data according to a control signal CNTL output from the motion compensating controller 30. The delay portion 312 includes a plurality of delays 3121 and 3122. After the first slice buffer is referenced, the output data from the remaining slice buffers is delayed, respectively, by 1-fold, 2-fold, 3-fold, up to n-fold, where n is the number of vertical pixels of the macro block, and the delayed data is output to field motion compensators 32 and 33 and frame motion compensator 34.

Preferably, there are at least as many slice buffers 3111, 3112 and 3113 in the slice buffer portion 311 as there are macro blocks that correspond to a vertical search area. The number of delays in the delay portion 312 is one less than the number of slice buffers.

Field motion compensators 32 and 33 receive the data necessary for motion compensation from the data interface 31, according to motion displacement signal MVXY and start signals STAMC31 and STAMC32 output from the motion compensating controller 30. The field motion compensators 32 and 33 perform vertical and horizontal interpolation on the received data and perform motion compensation, in units of one-half of a pixel, using the field motion vector.

Frame motion compensator 34 receives the data necessary for motion compensation from the data interface 31, according to motion displacement signal MVXY and start signals STAMC33 output from the motion compensating controller 30. The frame motion compensator 34 performs vertical and horizontal interpolation on the received data, and performs motion compensation, in units of one-half of one pixel, using the frame motion vector.

Multiplexer 35 selects and outputs one of the output signals of field motion compensators 32 and 33 and frame motion compensator 34, according to the control signal of the motion compensating controller 30.

Buffer 36 outputs the signal output from multiplexer 35 as a motion compensating signal, according to the control signal of the motion compensating controller 30.

Figure 5:
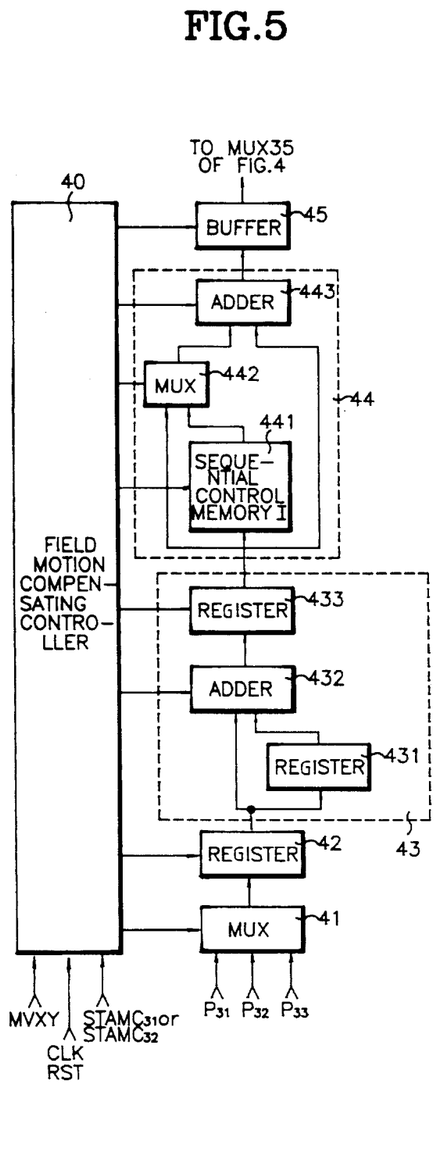
FIG. 5 is a detailed block diagram of the field motion compensator of FIG. 4.

As shown in FIG. 5, field motion compensators 32 and 33 each comprise a field motion compensating controller 40 which outputs control signals for controlling the operation of compensating for the motion of a field according to the motion displacement signal MVXY and starting signals STAMC31 and STAMC32 output from the motion compensating controller 30. The control signals output by the field motion compensating controller 40, control all of the elements of the field motion compensators 32 and 33. A multiplexer 41 selectively outputs the data from the data interface 31. A register 42 stores the data output from the multiplexer 41. A vertical interpolator 43 vertically interpolates the signal stored in register 42. A horizontal interpolator 44 horizontally interpolates the signal output from the vertical interpolator 43. And a buffer 45 outputs the signal received from the horizontal interpolator 44 to the multiplexer 35.

The vertical interpolator 43 includes a register 431 for temporarily storing the signal stored in register 42, an adder 432 for summing the signals output from registers 42 and 431, and a register 433 for temporarily storing the signal output from adder 432.

Horizontal interpolator 44 comprises a sequential control memory I (441) for temporarily storing the signal output from the vertical interpolator 43. A multiplexer 442 for selectively outputting the signals received from sequential control memory I (441) and vertical interpolator 43. And an adder 443 for summing the signals output from multiplexer 442 and vertical interpolator 43, and outputting the summed result to buffer 45.

Sequential control memory I (441) includes a register the size of one-half of the number of vertical pixels of the macro block in length.

Figure 6:
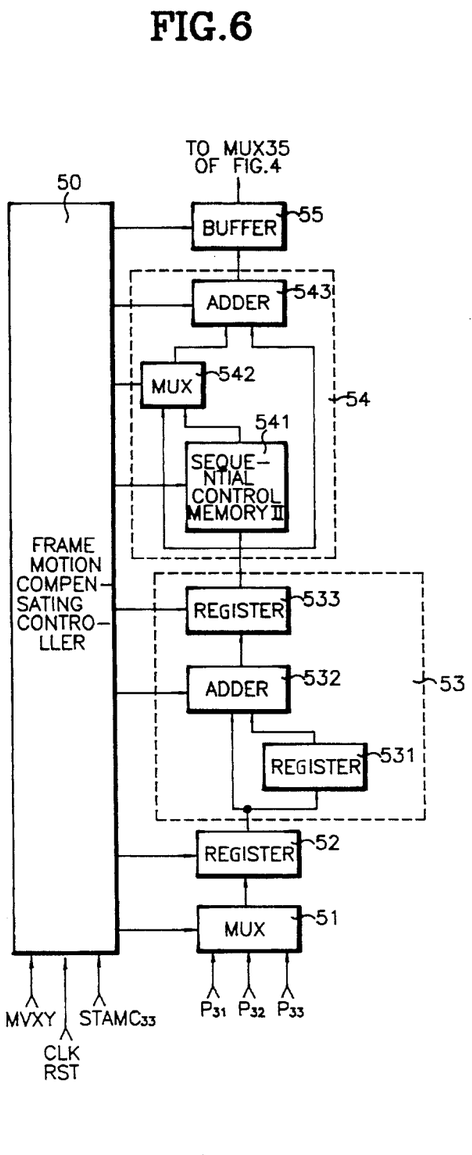
FIG. 6 is a detailed block diagram of the frame motion compensator of FIG. 4.

Frame motion compensator 34, as shown in FIG. 6, comprises a frame motion compensating controller 50 which outputs control signals for controlling the operation of compensating for the motion of a frame according to the motion displacement signal MVXY and starting signal STAMC33 output from motion compensating controller 30. The control signals output by the frame motion compensating controller 50, control all of the elements of the frame motion compensator 34. A multiplexer 51 selectively outputs the data output from the data interface 31. A register 52 stores the data output from the multiplexer 51. A vertical interpolator 53 vertically interpolates the signal stored in register 52. A horizontal interpolator 54 horizontally interpolates the signal output from the vertical interpolator 53. A buffer 55 outputs the signal received from the horizontal interpolator 54 to the multiplexer 35.

The vertical interpolator 53 includes a register 531 for temporarily storing the signal stored in register 52, an adder 532 for summing the signals output from registers 52 and 531, and a register 533 for temporarily storing the signal output from adder 532.

Horizontal interpolator 54 comprises a sequential control memory II (541) for temporarily storing the signal output from the vertical interpolator 53 according to the control signals of the frame motion compensating controller 50. A multiplexer 542 selectively outputs the signals received from the sequential control memory II (541), and the vertical interpolator 53, according to the control signals of the frame motion compensating controller 50. An adder 543 is provided for summing the signals output from the multiplexer 542 and the vertical interpolator 53, and outputting the summed result to buffer 55.

Sequential control memory II (541) includes a register the size of the number of vertical pixels of the macro block in length.

The operation of the motion compensator will be described below with reference to FIGS. 4–11.

Figure 7A:
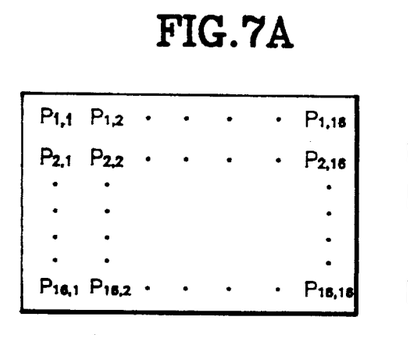
FIGS. 7A and 7B are diagrams depicting the sequence of pixel data input and output to/from a 16×16 macro block and slice buffer used in the motion compensator of the present invention.

First, if the motion vector is a field vector, a range of 16 pixels, from −8 to 7, is given as a search area horizontally and vertically. If the motion vector is a frame vector, a range of 32 pixels, from −16 to 15, horizontally and vertically is set as a search area. The size of a macro block is set to have 16×16 pixels as shown in FIG. 7A.

Figure 8A:
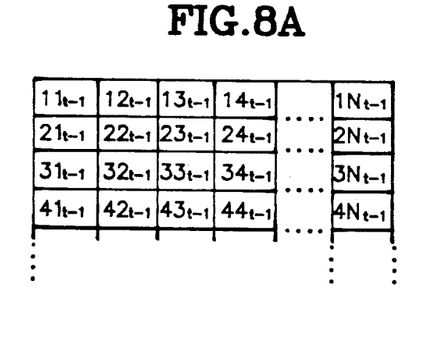
FIGS. 8A and 8B are diagrams showing the relationship of frames between time t and time t-1 for motion compensation in the motion compensator of the present invention.
Figure 8B:
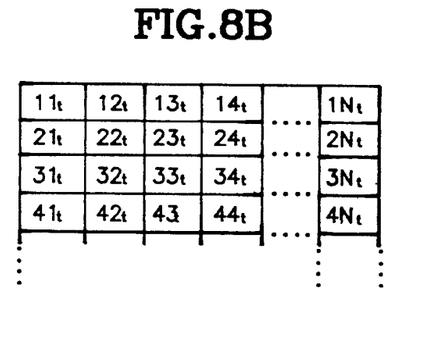

As shown in FIGS. 8A and 8B, a frame at preceding time t-1 and a frame at present time t are grouped by 16×16 pixels and the preceding and present frames are stored in units of blocks ($AB_t$, $AB_{t-1}$, for A and B are natural numbers such as 1, 2, 3, . . . ) for every macro block. For example, pixels necessary for performing motion compensation with respect to macro block $22_t$ include pixels of preceding frame t-1, block $22_{t-1}$, and pixels of eight nearby macro blocks $11_{t-1}$, $12_{t-1}$, $13_{t-1}$, $21_{t-1}$, $23_{t-1}$, $31_{t-1}$, $32_{t-1}$, and $33_{t-1}$.

The pixels of macro blocks of the preceding frame necessary for motion compensation are sequentially input, as the slice buffers 3111, 3112 and 3113 operate in accordance with a control signal CNTL output from motion compensating controller 30.

When pixels of macro blocks $11_{t-1}, 12_{t-1}, 13_{t-1}, \ldots, 1N_{t-1}$ of the preceding frame t-1 are sequentially input and stored in slice buffer 3111, and pixels of macro blocks corresponding to one slice are finished being stored in slice buffer 3111, the stored pixels are re-output to slice buffer 3112 in the input sequence and then stored in sequence. Here, pixels of macro blocks $21_{t-1}, 22_{t-1}, 23_{t-1}, \ldots, 2N_{t-1}$ of a next slice of the preceding frame are sequentially input and stored in slice buffer 3111. When the pixels are finished being stored in slice buffers 3111 and 3112, pixels of macro blocks $11_{t-1}, 12_{t-1}, 13_{t-1}, \ldots, 1N_{t-1}$, stored in slice buffer 3112, are re-output to slice buffer 3113 in the input sequence and then stored in sequence. Pixels of macro blocks $21_{t-1}, 22_{t-1}, 23_{t-1}, \ldots, 2N_{t-1}$, stored in slice buffer 3111, are re-output to slice buffer 3112 in the input sequence and then stored in sequence. Pixels of macro blocks, $31_{t-1}, 32_{t-1}, 33_{t-1}, \ldots, 3N_{t-1}$ of a next slice of the preceding frame are sequentially input and stored in slice buffer 3111.

Figure 7B:
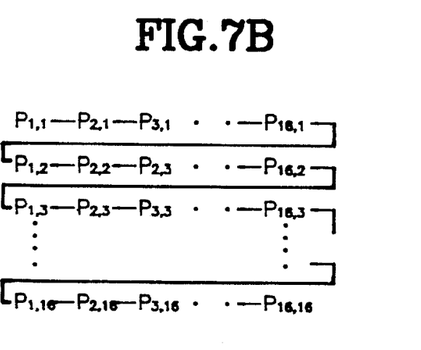

Pixel data $P_{E,F}$ (E and F are 1, 2, 3, ..., 16) of the respective macro blocks input and stored in slice buffers 3111, 3112 and 3113 are input in a sequence of vertical rows, starting with the first vertical row from the first pixel $P_{1,1}$ to the final pixel $P_{16,1}$, and ending with the vertical row from pixel $P_{1,16}$ of the second row to the final pixel $P_{16,16}$. FIG. 7B shows the resulting stored configuration.

The inputting and storing of pixels of macro blocks of the preceding frame t-1 are repeated until the motion compensation of the present frame t is finished.

The pixel data of the preceding frame stored in slice buffers 3111, 3112, and 3113 are delayed by the number of vertical pixels and by twice the number of vertical pixels of the respective macro blocks, in other words, by 16 pixels and 32 pixels in delays 3121 and 3122. The delayed data is input to field motion compensators 32 and 33 and frame motion compensator 34 along with the pixel data to the preceding frame output from slice buffer 3111.

Figure 9A:
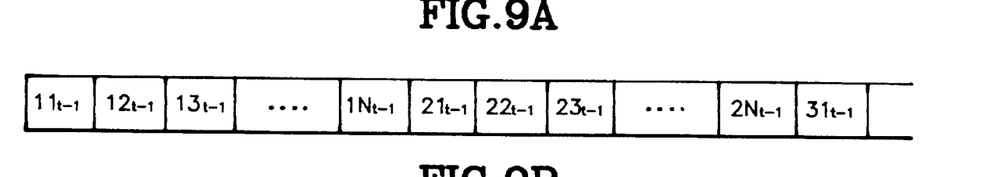
FIGS. 9A, 9B and 9C are diagrams depicting the timing of data input to the frame and frame motion compensators of FIG. 4.
Figure 9B:
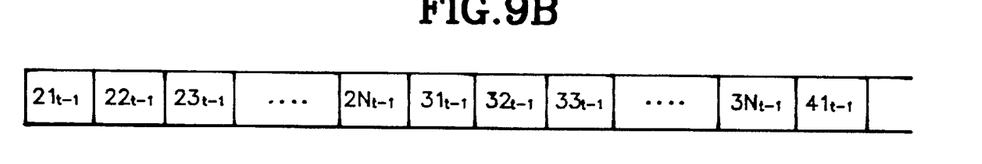
Figure 9C:
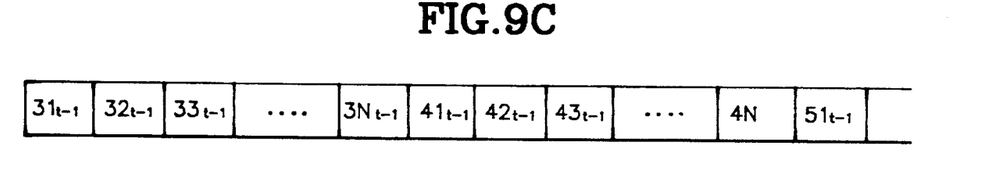

Specifically, the macro blocks of the preceding frame t-1 are input in synchronization with rows in slice buffers 3111, 3112 and 3113 and output as shown in FIGS. 9A, 9B and 9C. The pixel data are, however, delayed by 16 pixels and 32 pixels, respectively, so that, while the pixel data of the third row of macro block $33_{t-1}$ is output from slice buffer 3111, the pixel data of the second row of macro block $23_{t-1}$ is output from delay 3121 and the pixel data of the first row of macro block $13_{t-1}$ is output from delay 3122.

Pixel data of macro blocks P and Q of the respective slices are delayed by 16 pixels and input to input ports P31, P32 and P33 of field motion compensators 32 and 33 and frame motion compensator 34.

Figure 10:
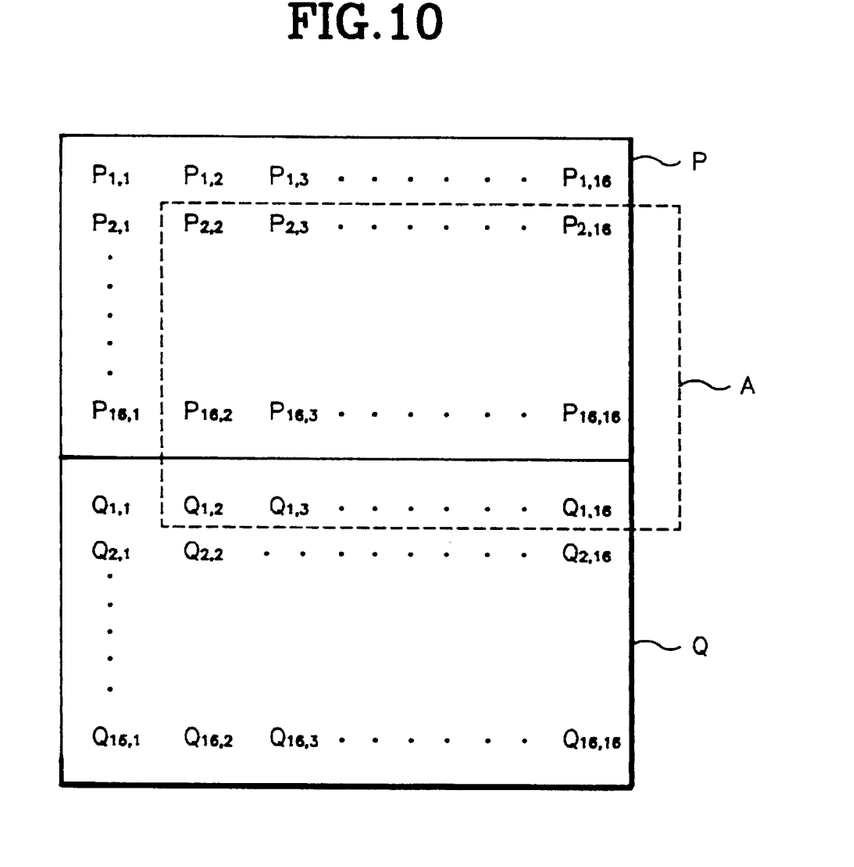
FIG. 10 is a diagram representing the operation of the data interface of FIG. 4.

As shown in FIG. 10, in the case where a macro block A to be motion-compensated lies across macro block P and macro block Q of a next slice, pixel data $P_{2,2}, P_{3,2}, \ldots, P_{16,2}$ of macro block P is input and then pixel data $Q_{1,2}$ of macro block Q of a next slice is input in field motion compensators 32 and 33 and frame motion compensator 34. After pixel data $P_{2,3}, P_{3,3}, \ldots, P_{16,3}$ of macro block P is input, pixel data $Q_{1,3}$ of macro block Q of a next slice is input.

Figure 11:
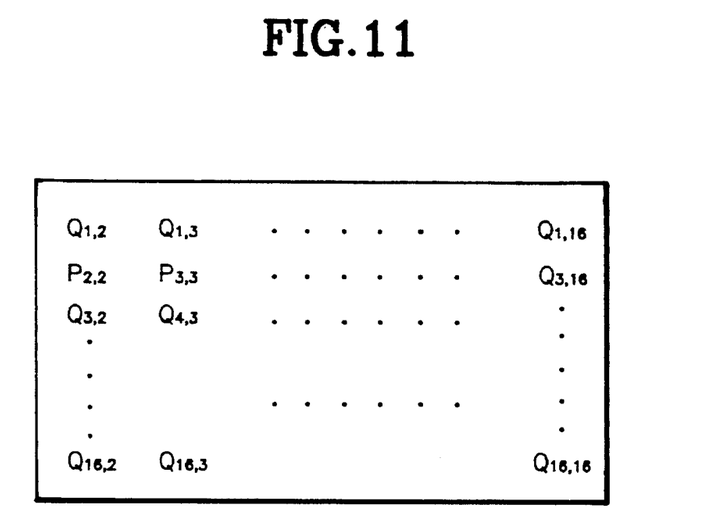
FIG. 11 is a diagram representing a signal input to the field and frame motion compensators when there is no delay in the data interface of FIG. 4.

If the pixel data input to input ports P31, P32 and P33 of field motion compensators 32 and 33 and frame motion compensator 34 is not delayed by 16 pixels, pixel data $Q_{1,2}$ of macro block Q are input, and then pixel data $P_{2,2}, P_{3,2}, \ldots, P_{16,2}$ of macro block P are input, and after pixel data $Q_{1,3}$ of macro block Q is input, pixel data $P_{2,3}, P_{3,3}, \ldots, P_{16,3}$ of macro block P are input. This mingles pixels of a macro block to be motion-compensated as shown in FIG. 11. In FIG. 11, the pixels of macro block Q are raised as compared with the pixels of macro block P, and thereby preclude motion compensation. The pixels of macro block Q must be placed below those of macro block P.

Three slice buffers 3111, 3112 and 3113 are preferred because there should be provided as many slice buffers as there are macro blocks which correspond to vertical search areas. Two delays 3121 and 3122 are needed.

Field motion compensators 32 and 33 and frame motion compensator 34 selectively operate according to the control of motion compensating controller 30. If the motion vector type is a field, the field motion compensators 32 and 33 operate so that motion compensation is performed for one field, respectively. If the motion vector type is a frame, the frame motion compensator 34 operates to perform motion compensation for a frame.

Field motion compensators 32 and 33 and frame motion compensator 34 select the data necessary for motion compensation of the respective macro blocks of the present frame t, from the pixel data output from the slice buffer 3111 and the delays 3121 and 3122. For example, in the case where the motion of macro block $22_t$ is compensated for, the pixels of the macro blocks necessary are selected and used from the sequential input of the macro block $22_{t-1}$ and eight nearby blocks. The selected data are vertically and horizontally interpolated so that motion compensation is performed by a resolution of one half of one pixel with respect to field/frame vectors.

Field motion compensators 32 and 33 are designed to compensate for the motion of first and second fields, respectively. Multiplexer 41 selects the data necessary for motion compensation from the pixel data rows of the signal input from the slice buffer 3111 and the delays 3121 and 3122 to the input ports P31, P32 and P33, according to the control signals of the field motion compensating controller 40. The selected data are stored in register 42.

The signal stored in register 42 is vertically interpolated, in units of one half of one pixel, by the vertical interpolator 43. Specifically, the signal stored in and output from register 42 is stored in register 431, according to the control signals of the field motion compensating controller 40, and then added to the signal output from register 42 in the adder 432 for the purpose of vertical interpolation in units of one half of one pixel. The added signal is temporarily stored in register 433. The signal stored in register 433 is horizontally interpolated, according to the control signals of the field motion compensating controller 40, in the horizontal interpolator 44. Specifically, the signal stored in and output from register 433, according to the control signals of the field motion compensating controller 40, is stored in sequential control memory I (441) of a length of one-half the number of vertical pixels of a macro block, and then input to and selected in multiplexer 442, together with the signal output from register 433. The selected signal is added to the signal output from register 433 in adder 443, for the purpose of horizontal interpolation, and then output to buffer 45. The signal temporarily stored in buffer 45 is output to multiplexer 35 according to the control of the field motion compensating controller 40.

Here, eight sets of pixel data, i.e., pixel data corresponding to a row of a macro block, are sequentially stored in sequential control memory I (441). Adders 432 and 443 only add the two input signals when vertical and horizontal interpolations are required. When the interpolations are not necessary, the signals output from registers 42 and 433 pass without change.

Frame motion compensator 34 operates in the same way as field motion compensators 32 and 33 in order to compensate for the motion of a frame. Sequential control memory II (541), includes a register, the length of 16 pixels, corresponding to the number of vertical pixels of a macro block. Horizontal interpolation is performed to compensate for the ratio of a frame in the same manner as the horizontal interpolation to compensate for the motion of a field. The motion compensated frame data is input to the multiplexer 35.

The data motion-compensated and output from field motion compensators 32 and 33, and frame motion compensator 34, are inputs to multiplexer 35 and are selected according to the control of motion compensating controller 30 and are then output via buffer 36.

Motion compensating controller 30 receives motion vector MV and motion vector type signal (MVT) in synchronization with the clock MVCK, thereby generating motion displacement signal MVXY for the motion vector and start signals STAMC31–STAMC33 for operating two field motion compensators 32 and 33 and frame motion compensator 34.

Figure 12:
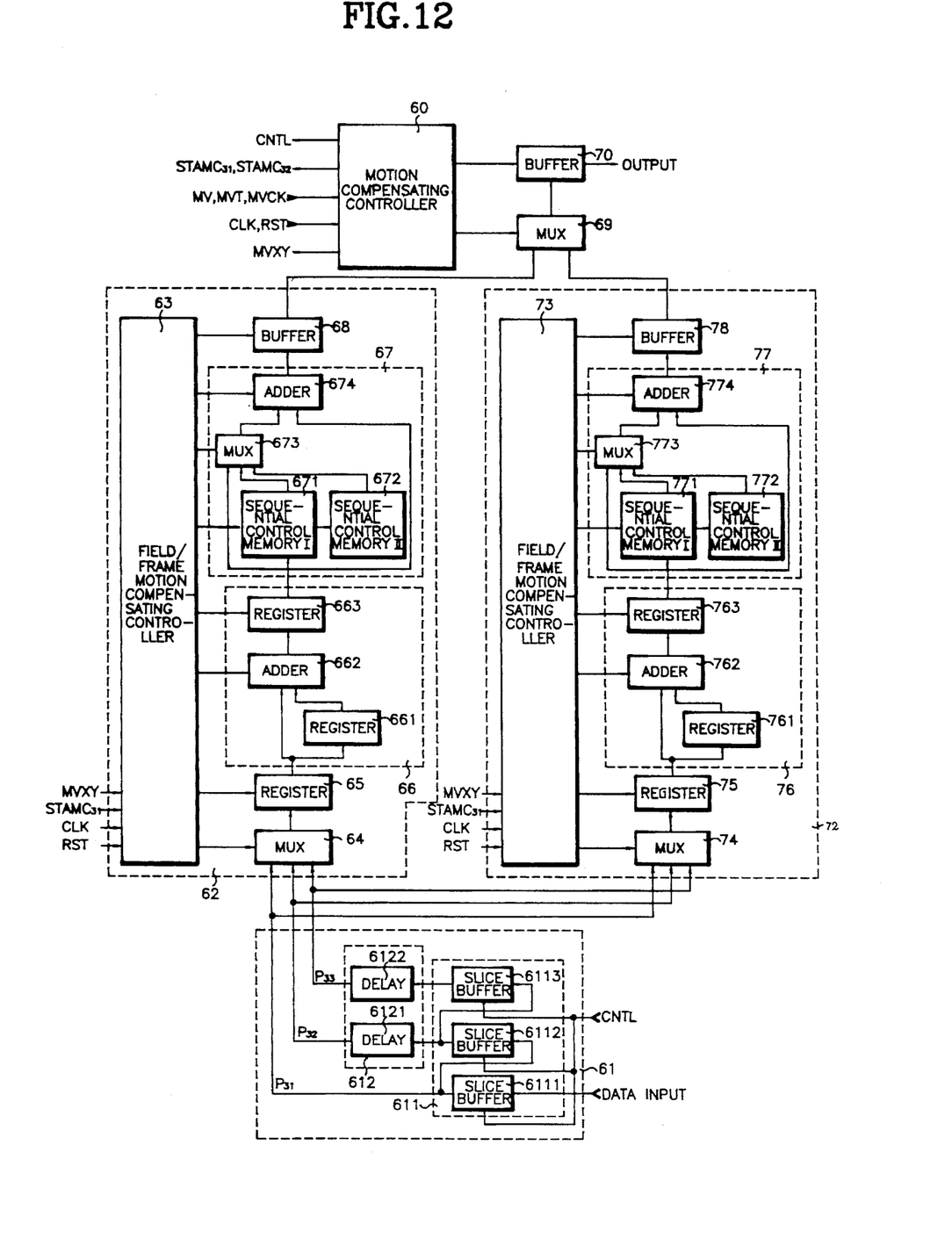
FIG. 12 is a block diagram illustrating another embodiment of the motion compensator of the present invention.

Another embodiment of the motion compensator for digital image restoration of the present invention, as shown in FIG. 12, comprises a motion compensating controller 60, a data interface 61, two field/frame motion compensators 62 and 72, a multiplexer 69, and a buffer 70.

In this embodiment, data interface 61, multiplexer 69, and buffer 70 are the same as those of the first embodiment of the motion compensator for restoring a digital image of the present invention. Motion compensating controller 60 is similar to the first embodiment of the present invention. Field/frame motion compensators 62 and 72 are formed by putting together the field motion compensators 32 and 33 and the frame motion compensator 34 of the first embodiment of the present invention.

The second embodiment of the motion compensator for restoring a digital image of the present invention will be described below in detail.

Motion compensating controller 60 receives a motion vector MV and a motion vector-type signal MVT, in synchronization with a clock MVCK, and generates a motion displacement signal MVXY of the motion vector, start signals STAMC31, STAMC32 and a control signal CNTL for controlling the entire operation of motion compensation.

Data interface 61 is made up of a slice buffer portion 611 and a delay portion 612. The slice buffer portion 611 includes a plurality of serially coupled slice buffers 6111, 6112, and 6113. These serial slice buffers sequentially shift input data according to a control signal CNTL which is output from the motion compensating controller 60. The delay portion 612 includes a plurality of delays 6121 and 6122. At the reference of the first slice buffer, the data output from the remaining slice buffers is delayed, respectively, by 1-fold, 2-fold, 3-fold, up to n-fold, where no is the number of vertical pixels of the macro block, and the delayed data is output to field/frame motion compensators 62 and 72. Data interface 61 sequentially shifts input data according to the control signal CNTL output from motion compensating controller 60.

There are as many slice buffers in the slice buffer portion 611 as there are macro blocks that correspond to the vertical search area. The delays of delay portion 612 are one fewer than the number of the slice buffers.

Field/frame motion compensators 62 and 72 receive the data necessary for motion compensation from the data interface 61, according to motion displacement signal MVXY and start signals STAMC31 and STAMC32 output from motion compensating controller 60. The field/frame compensators 62 and 72 perform vertical and horizontal interpolation, using the received data, and adaptively perform motion compensation in units of one half of one pixel using the field/frame motion vector.

Multiplexer 69 selects and outputs one of the output signals of field/frame motion compensators 62 and 72 according to the control signals of the motion compensating controller 60.

Buffer 70 outputs the signal output from multiplexer 69, as a motion compensating signal, according to the control signals of the motion compensating controller 60.

Field/frame motion compensators 62 and 72 comprise field/frame motion compensating controllers 63 and 73, which output control signals for controlling the operation of compensating for the motion of field and frame motion according to the motion displacement signal MVXY and starting signals STAMC31 and STAMC32 output from motion compensating controller 60. The control signals output by the field/frame motion compensating controllers 63 and 73, control all of the elements of the field/frame motion compensators 62 and 72. Multiplexers 64 and 74 selectively output the data from the data interface 61. Registers 65 and 75 store the data output from multiplexers 64 and 74. Vertical interpolators 66 and 76 vertically interpolate the signal stored in registers 65 and 75. Horizontal interpolators 67 and 77 horizontally interpolate the signal output from the vertical interpolators 66 and 76. And buffers 68 and 78 output the signal output from the horizontal interpolators 67 and 77 to multiplexer 69.

Similar to vertical interpolators 43 and 53 of the first embodiment of the present invention, vertical interpolators 66 and 76 consist of registers 661 and 761 for temporarily storing the signals stored in registers 65 and 75, adders 662 and 762 for summing the signals output from registers 65, 661, 75 and 761, according to the control signals of the field/frame motion compensating controllers 63 and 73, and registers 663 and 763 for temporarily storing the signals output from adders 662 and 762, according to the control signals of the field/frame motion compensating controllers 63 and 73.

Horizontal interpolators 67 and 77 comprise sequential control memories I (671 and 771) for temporarily storing the signals output from vertical interpolators 66 and 76, according to the control signals of the field/frame motion compensating controllers 63 and 73. Sequential control memories II (672 and 772) temporarily store the signals output from vertical interpolators 66 and 76, according to the control signals of the field/frame motion compensating controllers 63 and 73. Multiplexers 673 and 773 selectively output the signals output from sequential control memories I (671 and 771), sequential control memories II (672 and 772) and vertical interpolators 66 and 76, according to the control signals of the field/frame motion compensating controllers 63 and 73. Adders 674 and 774 sum the signals output from multiplexers 673 and 773 and vertical interpolators 66 and 76, according to the control signals of the field/frame motion compensating controllers 63 and 73, and output the summed result to buffers 68 and 78.

Sequential control memories I (671 and 771) include registers the size of one-half the number of vertical pixels of the macro block in length. Sequential control memories II (672 and 772) include registers the size of the number of vertical pixels of the macro block in length.

The second embodiment of the motion compensator for digital image restoration of the present invention makes use of the fact that field motion compensators 32 and 33 and frame motion compensator 34 do not operate simultaneously, but exclusively. The horizontal interpolators 67 and 77 of the field/frame motion compensators 62 and 72 include both sequential control memories I (671 and 771) and sequential control memories II (672 and 772) so that the horizontal interpolators 67 and 77 are selectively controlled by field/frame compensating controllers 63 and 73 for performing the horizontal interpolation of a field or a frame.

Specifically, in the case where the motion vector type is a field, two field/frame compensators 62 and 72 operate according to the control of motion compensating controller 60, thereby performing motion compensation with respect to one field, respectively. In other words, field/frame motion compensating controllers 63 and 73 operate sequential control memories I (671 and 771) only, in performing the horizontal interpolation of a field. The signals output from registers 663 and 763 are input and stored in sequential control memories I (671 and 771). The data output from sequential control memories I (671 and 771) are input to the multiplexers 673 and 773 together with the signals output from registers 663 and 763.

When the motion vector type is a frame, only one of two field/frame compensators 62 and 72 operates according to the control of motion compensating controller 60 for performing motion compensation with respect to the frame. Selected field/frame motion compensating controllers 63 and 73 operate sequential control memories II (672 and 772) only, for performing the horizontal interpolation of frame.

The signals output from registers 663 and 763 are input and stored in sequential control memories II (672 and 772). The data output from sequential control memories II (672 and 772) are input to multiplexers 673 and 773 together with the signals output from registers 663 and 763. Other operations of the second embodiment of the motion compensator of the present invention are the same as those of the first embodiment thereof.

As described above, the present invention compensates for the motion in a macro block by processing data fields and frames efficiently, thereby enabling the motion compensation to be processed in real time.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A motion compensator for restoring a digital image comprising:

a motion compensating controller for receiving a motion vector and a motion vector-type signal for indicating a vector type of field or frame, in synchronization with a clock and generating a motion displacement signal of the motion vector, start signals and a control signal, for controlling the entire operation of said motion compensator;

a data interface for sequentially shifting input data according to said control signal output from said motion compensating controller;

first and second field motion compensators for receiving said shifted data, output from said data interface, according to said motion displacement signal and said start signals output from said motion compensating controller, for performing vertical and horizontal interpolation on the received shifted input data, and for performing motion compensation in units of one half of one pixel with respect to a field motion vector;

a frame motion compensator for receiving said shifted input data, output from said data interface, according to said motion displacement signal and said start signals output from said motion compensating controller, for performing vertical and horizontal interpolation on the received shifted input data and for performing motion compensation in units of one-half of one pixel with respect to a frame motion vector; and a first multiplexer for selecting and outputting a compensated signal from one of said first and second field motion compensators and said frame motion compensator according to the control of said motion compensating controller.

2. A motion compensator for restoring a digital image as claimed in claim 1, further comprising a buffer for outputting the signal output from said first multiplexer as a motion compensating signal according to the control signal of said motion compensating controller.

3. A motion compensator for restoring a digital image as claimed in claim 1, wherein said data interface comprises:

a slice buffer portion having a plurality of serially coupled slice buffers, for sequentially shifting input data according to said control signal output from said motion compensating controller; and a delay portion having a plurality of delays, and after a first slice buffer outputs data, data output from remaining slice buffers is delayed by each of the plurality of delays respectively, by 1-fold, 2-fold, 3-fold, up to n-fold, where n is a number of vertical pixels of a macro block, and outputting the delayed data to said first and second field motion compensators and said frame motion compensator.

4. A motion compensator for restoring a digital image as claimed in claim 3, wherein there is provided as many of said slice buffers as there are macro blocks that correspond to the vertical search area.

5. A motion compensator for restoring a digital image as claimed in claim 4, wherein there is provided one fewer of said delays than the number of said slice buffers.

6. A motion compensator for restoring a digital image as claimed in claim 1, wherein said first and second field motion compensators each comprise:

a field motion compensating controller for outputting control signals for controlling the operation of compensating for a motion of field vectors according to said motion displacement signal and said starting signals output from said motion compensating controller;

a second multiplexer for receiving and selectively outputting the shifted input data, output from said data interface, according to the control signals of said field motion compensating controller;

a first register for storing data output from said second multiplexer according to the control signals of said field motion compensating controller;

a vertical interpolator for vertically interpolating the signal stored in said first register according to the control signals of said field motion compensating controller;

a horizontal interpolator for horizontally interpolating the signal output from said vertical interpolator according to the control signals of said field motion compensating controller; and a buffer for receiving and outputting a signal output from said horizontal interpolator, and outputting said received signal to said first multiplexer according to the control signals of said field motion compensating controller.

7. A motion compensator for restoring a digital image as claimed in claim 6, wherein said vertical interpolator comprises:

a second register for storing the signal stored in said first register;

an adder for summing the signals stored in said first and second registers according to the control signals of said field motion compensating controller; and a third register for storing a summed signal output from said adder according to the control signals of said field motion compensating controller.

8. A motion compensator for digital image restoration as claimed in claim 6, wherein said horizontal interpolator comprises:

a first sequential control memory for storing a signal output from said vertical interpolator according to the control signals of said field motion compensating controller;

a third multiplexer for selectively outputting the signals stored in said first sequential control memory and said signal output from said vertical interpolator according to the control signals of said field motion compensating controller; and an adder for summing signals output from said third multiplexer and said vertical interpolator according to the control signals of said field motion compensating controller and for outputting a summed result to said buffer.

9. A motion compensator for restoring a digital image as claimed in claim 8, wherein said first sequential control memory comprises a register a size of one-half of a number of vertical pixels of a macro block in length.

10. A motion compensator for restoring a digital image as claimed in claim 1, wherein said frame motion compensator comprises:

a frame motion compensating controller for outputting control signals for controlling the operation of compensating for a motion of frame vectors according to said motion displacement signal and said starting signals output from said motion compensating controller;

a second multiplexer for receiving and selectively outputting the shifted input data, output from said data interface, according to the control signals of said frame motion compensating controller;

a first register for storing data output from said second multiplexer according to the control signals of said frame motion compensating controller;

a vertical interpolator for vertically interpolating the signal stored in said first register according to the control signals of said frame motion compensating controller;

a horizontal interpolator for horizontally interpolating the signal output from said vertical interpolator according to the control signals of said frame motion compensating controller; and a buffer for receiving and outputting a signal output from said horizontal interpolator to said first multiplexer according to the control signals of said frame motion compensating controller.

11. A motion compensator for restoring a digital image as claimed in claim 10 wherein said vertical interpolator comprises:

a second register for storing the signal stored in said first register;

an adder for summing the signals stored in said first and second registers according to the control signals of said frame motion compensating controller; and a third register for storing a summed signal output from said adder according to the control signals of said frame motion compensating controller.

12. A motion compensator for restoring a digital image as claimed in claim 10, wherein said horizontal interpolator comprises:

a sequential control memory for storing a signal output from said vertical interpolator according to the control signals of said frame motion compensating controller;

a third multiplexer for selectively outputting the signals stored in said sequential control memory and said signal output from said vertical interpolator according to the control signals of said frame motion compensating controller; and an adder for summing signals output from said third multiplexer and said vertical interpolator according to the control signals of said frame motion compensating controller and for outputting a summed result to said buffer.

13. A motion compensator for restoring a digital image as claimed in claim 12, wherein said sequential control memory comprises a register a size of a number of vertical pixels of a macro block in length.

14. A motion compensator for restoring a digital image comprising:

a motion compensating controller for receiving a motion vector and a motion vector-type signal for indicating a vector type of field or frame, in synchronization with a clock and generating a motion displacement signal of the motion vector, start signals and a control signal, for controlling the entire operation of said motion compensator;

a data interface for sequentially shifting input data according to said control signal output from said motion compensating controller;

first and second field/frame motion compensators for receiving said shifted input data, output from said data interface, according to said motion displacement signal and said start signals output from said motion compensating controller, for performing vertical and horizontal interpolation on the received shifted input data, and for performing motion compensation in units of one-half of one pixel with respect to a field/frame motion vector; and a first multiplexer for selecting and outputting a compensated signal from one of said first and second field/frame motion compensators according to the control of said motion compensating controller.

15. A motion compensator for restoring a digital image as claimed in claim 14, further comprising a buffer for outputting the signal output from said first multiplexer as a motion compensating signal according to the control signal of said motion compensating controller.

16. A motion compensator for restoring a digital image as claimed in claim 14, wherein said data interrace comprises:

a slice buffer portion having a plurality of serially coupled slice buffers, for sequentially shifting input data according to said control signal output from said motion compensating controller; and a delay portion having a plurality of delays, and after a first slice buffer outputs data, data output from remaining slice buffers is delayed by each of the plurality of delays respectively, by 1-fold, 2-fold, 3-fold, up to n-fold where n is a number of vertical pixels of a macro block, and outputting the delayed data to said first and second field/frame motion compensators.

17. A motion compensator for restoring a digital image as claimed in claim 16, wherein there is provided as many of said slice buffers as there are macro blocks that correspond to the vertical search area.

18. A motion compensator for restoring a digital image as claimed in claim 17, wherein there is provided one fewer of said delays than the number of said slice buffers.

19. A motion compensator for restoring a digital image as claimed in claim 14, wherein said first and second field/frame motion compensators each comprise:

a field/frame motion compensating controller for outputting control signals for controlling the operation of compensating for motion of field vectors and frame vectors according to said motion displacement signal and said starting signals output from said motion compensating controller;

a second multiplexer for receiving and selectively outputting the shifted input data, output from said data interface, according to the control signals of said field/frame motion compensating controller;

a first register for storing data output from said second multiplexer according to the control signals of said field/frame motion compensating controller;

a vertical interpolator for vertically interpolating the signal stored in said first register according to the control signals of said field/frame motion compensating controller;

a horizontal interpolator for horizontally interpolating the signal output from said vertical interpolator according to the control signals of said field/frame motion compensating controller; and a buffer for receiving and outputting a signal output from said horizontal interpolator to said first multiplexer according to control signals of said field/frame motion compensating controller.

20. A motion compensator for restoring digital image as claimed in claim 19, wherein said vertical interpolator comprises:

a second register for storing the signal stored in said first register;

an adder for summing the signals stored in said first and second registers according to the control signals of said field/frame motion compensating controller; and a third register for storing a summed signal output from said adder according to the control signals of said field/frame motion compensating controller.

21. A motion compensator for restoring a digital image as claimed in claim 19, wherein said horizontal interpolator comprises:

a first sequential control memory for storing a signal output from said vertical interpolator according to the control signals of said field/frame motion compensating controller;

a second sequential control memory for storing a signal output from said vertical interpolator according to the control signals of said field/frame motion compensating controller;

a third multiplexer for selectively outputting the signals stored in said first sequential control memory, said second sequential control memory and said signal output from said vertical interpolator, according to the control signals of said field/frame motion compensating controller; and an adder for summing signals output from said third multiplexer and said vertical interpolator according to the control signals of said field/frame motion compensating controller and for outputting a summed result to said buffer.

22. A motion compensator for restoring a digital image as claimed in claim 21, wherein said first sequential control memory comprises a register a size of one-half of a number of vertical pixels of a macro block in length.

23. A motion compensator for restoring a digital image as claimed in claim 21, wherein said second sequential control memory comprises a register a size of a number of vertical pixels of a macro block in length.

* * * * *